UNITED STATES PATENT OFFICE.

THOMAS NELSON, OF WEST TROY, ASSIGNOR TO NEW YORK QUARTZ COMPANY, OF NEW YORK, N. Y.

IMPROVED EMERY-WHEEL.

Specification forming part of Letters Patent No. 44,918, dated November 1, 1864.

*To all whom it may concern:*

Be it known that I, THOMAS NELSON, of West Troy, in the county of Albany and State of New York, have invented, made, and applied to use a certain new and useful Improvement in the Manufacture of Emery Wheels, Slabs, &c.; and I do hereby declare the following to be a full, clear, and exact description of the nature of the said invention and of the features which distinguish the same from other modes of manufacturing emery-wheels, &c.

A composition of india-rubber and emery has heretofore been made from which slabs, wheels, &c., have been formed in molds. This is costly, and only forms a mechanical mixture, the rubber holding the emery together only by the adhesive character of the rubber. Glue and liquid silica have also been employed for retaining the fine particles of emery together in the form of wheels, slabs, &c.

The nature of my said invention consists in manufacturing emery wheels, slabs, &c., of a composition of emery and clay with a flux—such as borax—by molding such composition in the form of wheels, slabs, rings, or other required shape, and subjecting the same to a sufficient heat to vitrify the mass to the extent required for holding the particles of emery firmly together. None of these materials are of a character to interfere with the grinding operation or become sticky, as is the case to a greater or less extent with india-rubber and glue, and the vitrified clay firmly holds the particles together, and, wearing away in use more easily than the emery, leaves the cutting-edges of said particles free and unobstructed for the grinding operations. Hence such surfaces do not dull nor become glazed with dirt as quickly as the wheels formerly employed.

The proportion of clay need only be sufficient to fill the interstices between the particles of emery when pressed together, and the flux only sufficient in quantity to cause the clay to partially vitrify at a low temperature. I have found that about nine parts of clay and six of borax, by weight, thoroughly mixed together and rendered plastic by water, will be sufficient for about twenty-eight parts of emery.

Care must be taken that the mixing is thorough and uniform, after which the wheel, slab, ring, or other article is formed of said materials by pressure in a suitable mold, and then baked, only sufficient heat being employed to vitrify the clay and flux and not injure the emery by too much heat.

A small proportion of litharge may be employed as a flux, or any desired material may be introduced to impart color to the clay corresponding to the color of the emery.

What I claim, and desire to secure by Letters Patent, is—

Manufacturing wheels, slabs, rings, or other grinding articles or surfaces of the composition and substantially in the manner specified.

In witness whereof I have hereunto set my signature this 7th day of September, A.D. 1863.

THOMAS NELSON.

Witnesses:
LEMUEL W. SERRELL,
CHAS. H. SMITH.